(12) United States Patent
Grewe et al.

(10) Patent No.: US 9,690,993 B2
(45) Date of Patent: Jun. 27, 2017

(54) METHOD AND DEVICE FOR ANALYZING TRAFFICABILITY

(71) Applicant: Conti Temic microelectronic GmbH, Nuremberg (DE)

(72) Inventors: Ralph Grewe, Frankfurt am Main (DE); Stefan Hegemann, Wangen (DE); Matthias Zobel, Wasserburg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 14/647,958

(22) PCT Filed: Dec. 6, 2013

(86) PCT No.: PCT/DE2013/200336
§ 371 (c)(1),
(2) Date: May 28, 2015

(87) PCT Pub. No.: WO2014/090245
PCT Pub. Date: Jun. 19, 2014

(65) Prior Publication Data
US 2015/0324649 A1 Nov. 12, 2015

(30) Foreign Application Priority Data
Dec. 11, 2012 (DE) .......................... 10 2012 112 104

(51) Int. Cl.
*G06K 9/52* (2006.01)
*G06K 9/00* (2006.01)
(Continued)

(52) U.S. Cl.
CPC ..... *G06K 9/00798* (2013.01); *G06K 9/00791* (2013.01); *G06K 9/00805* (2013.01);
(Continued)

(58) Field of Classification Search
None
See application file for complete search history.

(56) References Cited

U.S. PATENT DOCUMENTS 6,104,812 A * 8/2000 Koltai ................... G06T 1/0021
283/113
8,140,358 B1 * 3/2012 Ling ....................... G06Q 40/08
340/439

(Continued)

FOREIGN PATENT DOCUMENTS

| CN | WO 2015024257 A1 * | 2/2015 | ........... G06T 7/0081 |
|---|---|---|---|
| DE | 102005045017 | 3/2007 | |

(Continued)

OTHER PUBLICATIONS

International Search Report of the International Searching Authority for International Application PCT/DE2013/200336, mailed Mar. 28, 2014, 3 pages, European Patent Office, HV Rijswijk, Netherlands.

(Continued)

*Primary Examiner* — Tsung-Yin Tsai
(74) *Attorney, Agent, or Firm* — W. F. Fasse

(57) ABSTRACT

A method and a device for analyzing trafficability use a computer to perform the following steps:
- receiving image data representing an image of surroundings in front of a vehicle,
- analyzing the image data to identify different zones in the image of the surroundings, and
- analyzing the identified different zones in terms of trafficability thereof for the vehicle.

16 Claims, 3 Drawing Sheets

(51) Int. Cl.
  *G06K 9/46* (2006.01)
  *G06T 7/20* (2017.01)
  *G06T 7/40* (2017.01)
  *G06T 7/11* (2017.01)

(52) U.S. Cl.
  CPC ............ *G06K 9/46* (2013.01); *G06K 9/4652* (2013.01); *G06K 9/52* (2013.01); *G06T 7/11* (2017.01); *G06T 7/20* (2013.01); *G06T 7/40* (2013.01); *G06K 2009/4666* (2013.01)

(56) References Cited

U.S. PATENT DOCUMENTS

| | | | | |
|---|---|---|---|---|
| 8,340,421 | B2* | 12/2012 | Sullender | G06K 9/4638 382/173 |
| 8,797,417 | B2* | 8/2014 | Gayko | G06T 5/005 348/154 |
| 8,861,791 | B2* | 10/2014 | You | G06K 9/00208 382/104 |
| 2003/0011597 | A1* | 1/2003 | Oizumi | G06T 5/006 345/427 |
| 2004/0247157 | A1* | 12/2004 | Lages | G06K 9/00805 382/103 |
| 2005/0100192 | A1* | 5/2005 | Fujimura | G06K 9/00369 382/103 |
| 2008/0040004 | A1* | 2/2008 | Breed | B60R 21/0134 701/45 |
| 2008/0046150 | A1* | 2/2008 | Breed | B60R 21/0134 701/45 |
| 2009/0192686 | A1 | 7/2009 | Niehsen et al. | |
| 2010/0013615 | A1 | 1/2010 | Hebert et al. | |
| 2010/0104199 | A1 | 4/2010 | Zhang et al. | |
| 2012/0027258 | A1* | 2/2012 | Uchida | G06K 9/00805 382/103 |
| 2012/0306860 | A1* | 12/2012 | Hatta | H04N 13/0278 345/419 |
| 2014/0343842 | A1* | 11/2014 | Ranganathan | G01C 21/30 701/472 |
| 2015/0165972 | A1* | 6/2015 | Takemae | G06T 7/60 348/148 |
| 2015/0165973 | A1* | 6/2015 | Takemae | G08G 1/167 348/148 |

FOREIGN PATENT DOCUMENTS

| | | | | |
|---|---|---|---|---|
| EP | 1 684 142 | | 7/2006 | |
| FR | 2898986 | A1 * | 9/2007 | ........... G01S 17/023 |

OTHER PUBLICATIONS

PCT International Preliminary Report on Patentability including English Translation of PCT Written Opinion of the International Searching Authority for International Application PCT/DE2013/200336, issued Jun. 16, 2015, 10 pages, International Bureau of WIPO, Geneva, Switzerland.

German Search Report for German Patent Application No. 10 2012 112 104.4, dated Nov. 26, 2013, 6 pages, Muenchen, Germany, with English translation, 5 pages.

Y. Kang et al., "Texture Segmentation of Road Environment Scene Using SfM Module and HLAC Features", IPSJ Transactions on Computer Vision and Applications, vol. 1, Sep. 2009, pp. 220 to 230.

Andreas Wedel et al., "B-Spline Modeling of Road Surfaces for Freespace Estimation", 2008 IEEE Intelligent Vehicles Symposium, Eindhoven University of Technology, Eindhoven, The Netherlands, Jun. 4-6, 2008, pp. 828 to 833.

* cited by examiner

METHOD AND DEVICE FOR ANALYZING TRAFFICABILITY

FIELD OF THE INVENTION

The invention relates to a method and a device for analyzing trafficability, which are particularly suitable for use in driver assistance systems.

BACKGROUND INFORMATION

Camera-based driver assistance systems which identify the course of the vehicle's own lane using the lane markings are now established on the market, and their use is already prescribed by law in certain applications. Typically, these driver assistance systems identify the course of the markings of their vehicle's own lane and the neighboring lanes and use these to estimate the position of the own vehicle relative to the lane markings. An unintentional departure from the lane can therefore be detected early on and the system can initiate a suitable reaction such as, for example, warn the driver of the departure from the lane or prevent the departure from the lane by controlling the steering.

Further developed driver assistance systems which not only warn the driver in the event of a departure from a lane or prevent the departure, but which are also intended to assist the driver, for example, with an avoiding maneuver, need more information on the possible path of their own vehicle for such a function than is determined by the above-mentioned purely lane marking-detecting systems. If, for example, the objective of a driver assistance system is to prevent an accident by means of a suitable automatic avoiding maneuver, such a system requires, in addition to information on its own lane, reliable information on whether a possible avoiding path is even trafficable, so that the vehicle does not sustain or cause more damage as a result of the avoiding maneuver than would be the case if it were to have an accident as a result of not making an avoiding maneuver. The determining of such information is referred to herein as a trafficability analysis.

SUMMARY OF THE INVENTION

An object of embodiments of this invention is to propose a method and a device for analyzing trafficability.

This object can be achieved by one or more of the embodiments of the invention as set forth herein.

One concept underlying at least one embodiment of the invention is to identify different zones during the analysis of image data and/or data of surroundings in front of a vehicle and to analyze these in terms of trafficability for its own vehicle, i.e. a subject vehicle. The term "image data" within the context of this invention is used to denote not only the data generated by the camera-based system, but also the data generated by all of the systems for detecting the surroundings, therefore, for example, also radar-based and lidar-based systems which can provide data of surroundings. According to one particular aspect, the identification of different zones is based on an estimated ground plane of the surroundings, as a result of which computing time can be saved and thus, as a rule, analysis results are obtained more quickly. According to another particular aspect of the invention driving activities identified in different zones are included in the trafficability analysis, as a result of which a more reliable analysis result can be obtained. These two particular aspects of this invention can, for example, be implemented together in a driver assistance system, which can allow the system to carry out a relatively reliable and rapid trafficability analysis.

One embodiment of the invention now relates to a method for analyzing trafficability using a computer, said method comprising the following steps: receiving image data of surroundings in front of a vehicle, analyzing the image data to identify different zones in an image of the surroundings, and analyzing identified different zones in terms of trafficability for the vehicle.

The analyzing of the image data to identify different zones can comprise the following steps:
calculating the position of pixels in the space from the image data received from several images with the aid of a stereo-vision method,
estimating of a ground plane based on the calculated positions of pixels in the space,
determining of relevant pixels for a segmenting of the estimated ground plane,
carrying out of a segmenting of the estimated ground plane for the relevant pixels, and
outputting of different zones identified by means of the segmenting.

A method based on images of surroundings captured with a plurality of camera optics or camera imagers, or a method based on recording with a camera optic at various positions using own motion (motion stereo), can be used as a stereo-vision method.

The segmenting of the estimated ground plane for the relevant pixels can be carried out using color, saturation, intensity and/or texture information.

The segmenting of the estimated ground plane for the relevant pixels can be carried out using variance information of the calculated positions of pixels in the space.

The analyzing of identified different zones in terms of trafficability for the vehicle can comprise the identification of obstacles, particularly raised objects, and/or the identification of driving activities. It is hereby particularly understood that the term 'driving activity' is used to indicate that a vehicle other than the system's own vehicle is currently driving or has already driven into a zone. The driving activity can, in particular, include information about the direction of travel of the other vehicle, as a result of which oncoming traffic or even cross traffic can be considered. In particular, a zone can be excluded from trafficability because of identified driving activity. This applies, for example, to oncoming traffic, even if trafficability is, in principle, possible but actually doing so would constitute a great risk of a head-on collision.

A temporary exclusion of such a zone from a general clearance is also possible, if a risk has currently been identified.

The identifying of driving activities can comprise the receiving and evaluating of data from camera-based, radar-based and/or lidar-based object detection and/or the receiving and evaluating of a list of objects generated with camera-based, radar-based and/or lidar-based object detection.

The identifying of driving activities can also comprise long-term monitoring of driving activities in order to increase the reliability of detection, the transfer of a trafficability classification to similar image zones and/or a dynamic exclusion of trafficability, in the event of a risk being identified by driving activity monitoring.

A further embodiment of the invention relates to a device for analyzing trafficability using a computer having first means for receiving image data of surroundings in front of a vehicle, second means for analyzing the image data to identify different zones in an image of the surroundings, and third means for analyzing identified different zones in terms of trafficability for the vehicle.

The second means can be configured to carry out a method according to the invention and as described above, and the third means can be configured to carry out a method according to the invention and as described above.

A further embodiment of the invention relates to a driver assistance system having a device according to the invention and as described herein.

BRIEF DESCRIPTION OF THE DRAWINGS

Further advantages and possible applications of this invention are set out in the following description in conjunction with the embodiment(s) illustrated in the drawing(s).

The terms and associated reference numerals used in the list of reference numerals indicated at the end of this description will be used consistently throughout this patent application.

DETAILED DESCRIPTION OF EXAMPLE EMBODIMENTS OF THE INVENTION

Figure 1:
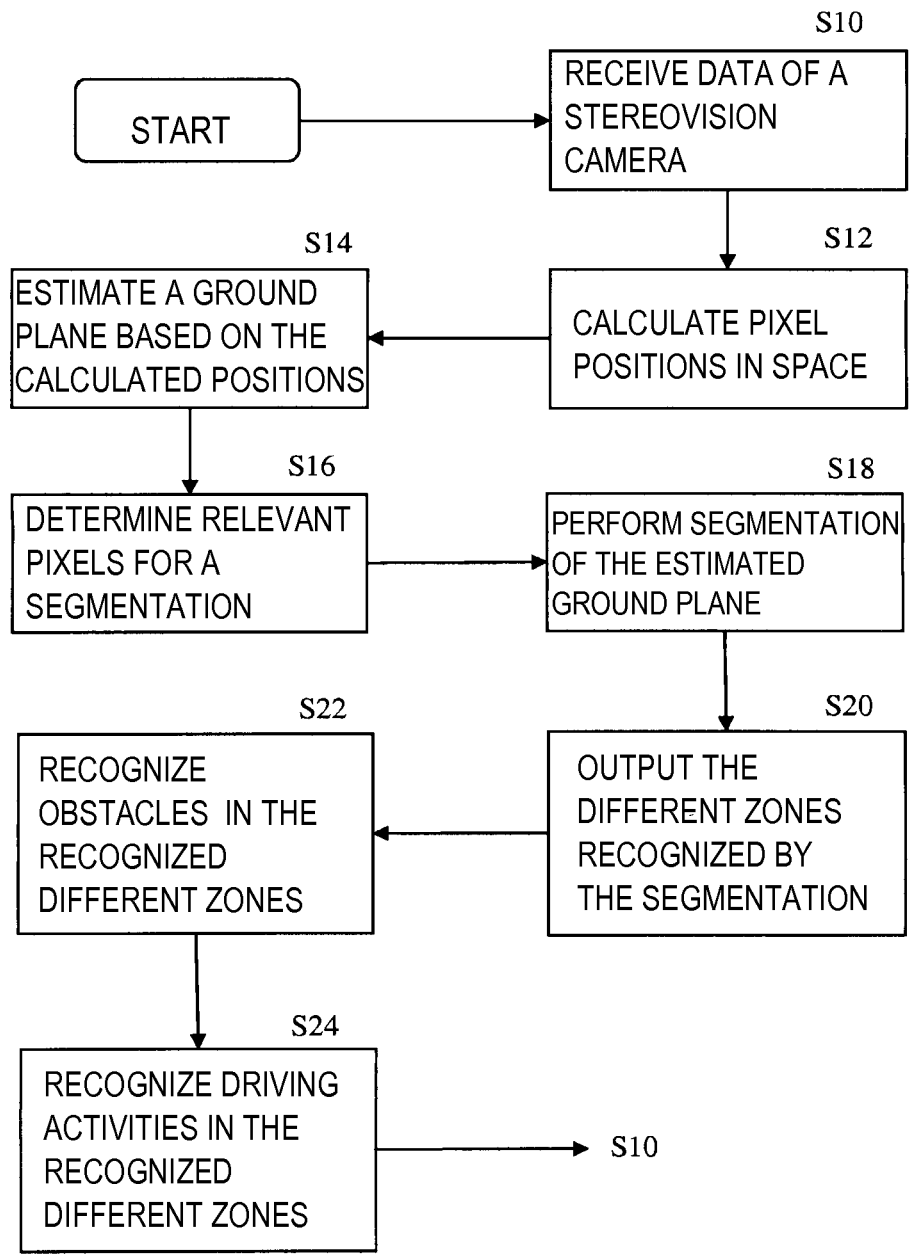
FIG. 1 shows a flow diagram of an embodiment of a method for analyzing trafficability according to the invention.

Identical, functionally identical and functionally related elements can be provided with the same reference numerals in the following description. Absolute values are only indicated by way of example in the following and should not be construed as limiting the invention.

The flowchart of a program deployed by a computer shown in FIG. 1 is used to analyze image data that has been generated, for example, with a stereovision camera which captures images of the surroundings in front of a vehicle and which can be part of a camera-based driver assistance system. More particularly, the image data is analyzed in terms of trafficability by the vehicle, for example, in order to be able to quickly determine a suitable alternative route in the event that the vehicle must perform an avoidance maneuver.

In the case of the method implemented by the program, digital image data of surroundings in front of the vehicle is first received by the stereovision camera for the trafficability analysis in a step S10, for example via a special image data transmission line, a vehicle bus or a radio link.

The image data received is then analyzed in subsequent steps S12-S20, in order to identify different zones in the image of the surroundings. By means of additional analysis in steps S22-S24, the different zones identified in the previous steps are analyzed in terms of their trafficability by the vehicle and trafficable zones are identified. The zones identified as trafficable can then be output, in order to be processed by a driver assistance system which is intended to assist a driver in the event of an avoiding maneuver and to indicate trafficable, alternative routes to the driver.

Figure 2:
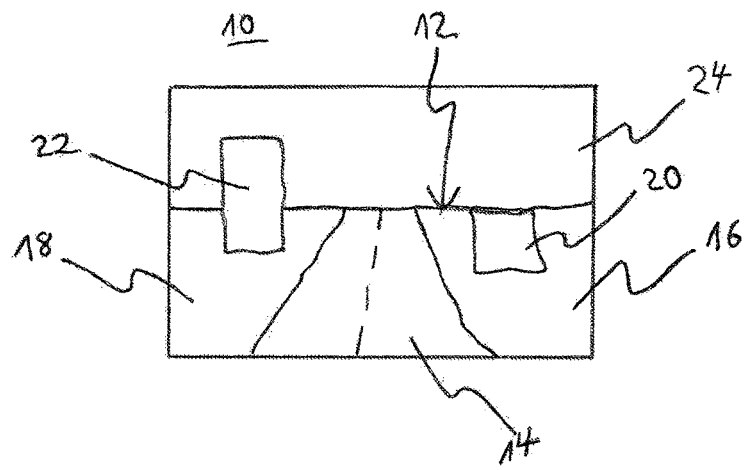
FIG. 2 shows an example of an image of the surroundings in front of a vehicle captured with a digital camera, wherein the image is segmented by a method according to an embodiment of this invention for a trafficability analysis.

A trafficable zone can typically be determined by means of the analysis of changing or unchanging textures, e.g. by identifying a transition from a bitumen roadway to turf at the roadside, for a trafficability analysis. However, it is frequently not possible to assess the trafficability of the zones bordering the vehicle's own lane reliably from image data alone. Thus, a neighboring lane could be provided with a different surface to the vehicle's own lane, but could be depicted in the image as an unpaved sandy strip. This problem of separating and identifying different zones can also arise in the case of the stereovision methods which are frequently used nowadays, which calculate a spatial (3D) coordinate for each pixel of images captured with a 3D camera. With the aid of these methods it is, in principle, possible to separate raised objects from the ground plane, as indicated in FIG. 2, for example by an example image 10 of typical scenery of the environment in front of a vehicle. Raised objects 20 and 22 can, in this case, be separated from the ground plane 12. If, however, there are different zones inside the ground plane 12, for example an asphalt road 14 delimited by grasslands (right and left side areas 16 and 18 respectively), it is frequently not possible to separate the zones reliably (separation into trafficable/non-trafficable).

A separation of different zones, even included within one plane such as the ground plane 12 could, in principle, be carried out by means of, for example, color, intensity or texture-based segmenting of mono-images, i.e. the separation of different zones within the ground plane 12 such as the asphalt road 14 and the adjacent grasslands 16 and 18 and the right object/obstacle 20 (FIG. 2) and 30, (FIG. 3), which do/does not protrude beyond the horizontal line of the ground plane 12. A significant disadvantage of these methods, however, is the high computational cost required which, to date, has militated against their series use, particularly in driver assistance systems.

The method according to an example embodiment of the invention now combines a texture-based segmenting with stereovision in the following steps, in order to obtain the advantages of both methods with a reduced computational cost. To this end, the segmenting can be carried out only for the zone that cannot be further subdivided with the stereovision method and/or the stereo method (only the ground plane 12 in FIG. 2 instead of the full, bordered or framed zone including the objects). Compared to a pure stereo method, a segmented ground plane, in which trafficable zones are separated from non-trafficable zones, is obtained, wherein the computational cost or effort is reduced compared to segmenting of the complete image.

To this end, in step S12, the position of pixels in the space is calculated from a plurality of images captured with the stereovision camera, with the aid of a stereovision approach. Based on the spatial points an estimate of the ground plane 12 is carried out in the next step S14. With the aid of the particular ground plane, the relevant pixels for a segmenting of the ground plane 12 can be determined in step S16. A segmenting of the ground plane 12 is carried out for these pixels in step S18. As the number of pixels to be segmented is much lower than in the original image, the computational cost for the segmenting stage S18 can be significantly reduced. As a result, a segmenting of the ground plane 12, which provides additional information about trafficable/non-trafficable zones, is obtained.

Methods which are based on a plurality of optics/imagers or motion stereo approaches can be used as stereo methods. The segmenting of the selected pixels can be carried out using color, intensity or texture. In addition to these features which are available for segmenting from the mono image (e.g. color, saturation, intensity, texture), additional information can be obtained from the stereo method for segmenting, e.g. the variance of the height of the spatial points (the variance is e.g. higher for grassland next to the roadway than for a flat road surface) or a low height deviation can be used.

The technical advantage of this approach is a segmenting of points in the ground plane by means of features in the image (e.g. intensity, color, texture), wherein computing time is saved compared with a segmenting of the complete image by a suitable selection of the pixels (stereo ground plane) and also additional information is provided for the segmenting (e.g. variance in the height of the spatial points). The decisive factor is the selection of pixels to be segmented from the image with the aid of an estimation of the (relevant) ground plane which is carried out with the aid of a stereo method.

The different zones 14, 16, 18 of the ground plane 12 obtained by means of the segmenting in step S18 (see FIGS. 2 and 3) are output in a subsequent step S20 for further processing by a driver assistance system. As part of the further processing, the outputted different zones are analyzed in terms of their trafficability in subsequent steps S22 and S24.

In step S22, for example, obstacles 20 and 22 in the right and left side areas 16 and 18 respectively of the road 14 (FIG. 2) and/or obstacles 30 and 32 in the right side area 16 of the road 14 (FIG. 3) are identified, for example by means of a texture, color or intensity analysis. If obstacles 20 and 22 and/or 30 and 32 are identified in a zone, the corresponding zones 16 and 18 having an obstacle 20 and/or 22 (FIG. 2) and the zone 16 having obstacles 30 and 32 (FIG. 3) are marked as "non-trafficable". On the other hand, zones without obstacles are marked as "trafficable".

In a further step S24 for analyzing trafficability, information regarding whether a driving activity has already been or is being perceived in the areas surveyed flows into the trafficability assessment or analysis from zones around the vehicle. Such driving activity could be determined by one of the vehicle's own sensors, e.g. by means of camera-based object detection, or even by the amalgamation with other sensors, e.g. with the list of objects of a radar-based sensor.

Figure 3:
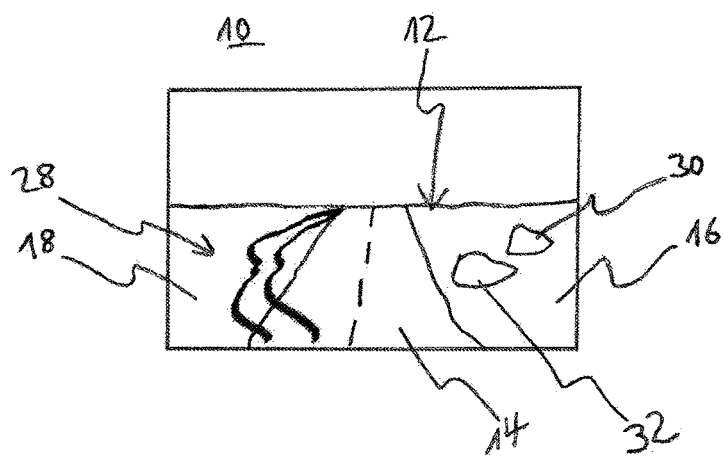
FIG. 3 shows another example of an image of the surroundings in front of a vehicle captured with a digital camera, wherein the image is segmented by a method according to an embodiment of this invention for a trafficability analysis.

If, as shown in FIG. 3, driving activity 28 has been identified in a zone 18 in the image, this zone can most likely be deemed to be trafficable. Monitoring of the zone over a longer period of time can thereby contribute to a correspondingly higher reliability of this assessment. In addition, it is possible to transfer an existing estimate to similar image regions without driving activity explicitly being identified there. If the analysis demonstrates that the zone 18 is trafficable, this zone is marked "trafficable" as a result.

Of course, it is conceivable to also explicitly exclude regions from trafficability on the basis of the monitoring of driving activity, if the trafficability of the zone were in principle possible, but actually doing so would constitute too high a risk or a danger, e.g. because oncoming traffic has been identified there. This might also only happen temporarily, i.e. general clearance of trafficability, but temporary blocking, if a hazard has been identified.

In general, the approach according to step S24 is not limited to camera-based systems, but the analysis and associated consideration of driving activity can be used in all systems for estimating trafficability.

The zones marked "non-trafficable" and "trafficable" can be further processed by the driver assistance system, in particular they can be used to determine a possible alternative route in the event of an obstacle being located on the road 14. If an avoiding maneuver is necessary, a determined alternative route can either be passively indicated to the driver, for example by means of a visual display or by a voice command similar to a navigation system, or a determined alternative route can be used for an active intervention in the vehicle controls, for example in order to generate autonomous steering interventions in order to initiate and possibly carry out an avoiding maneuver.

Figure 4:
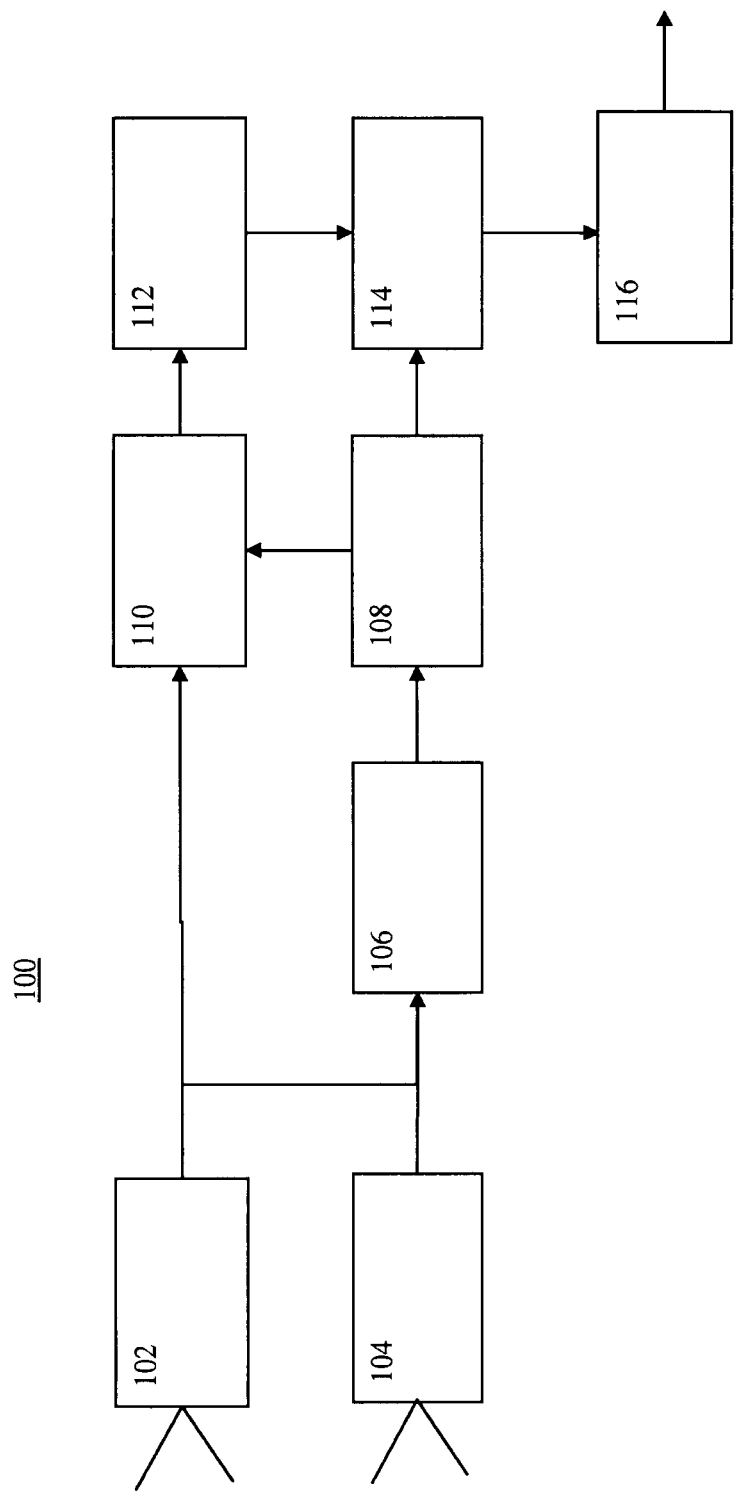
FIG. 4 shows a block diagram of an example embodiment of a device for analyzing trafficability according to the invention.

FIG. 4 shows a block diagram of a device for analyzing trafficability 100 according to an embodiment of the invention which processes data from a stereovision camera with a first and second camera 102 and 104 respectively. The two cameras 102 and 104 provide image data of surroundings in front of a vehicle. This image data is supplied to a stereovision processing unit 106 which calculates the position of pixels in the space, i.e. carries out the method step S12 explained above. The calculated pixel positions in the space are transmitted to a ground plane estimation unit 108 which estimates a ground plane in the images of the surroundings using the spatial points obtained in accordance with the method step S14 explained above. A relevant pixel selection unit 110 determines, based on the ground plane estimated by the unit 108 and the image data from the two cameras 102 and 104, relevant pixels for a segmenting of the ground plane (in accordance with the method step S16 explained above). Based on the relevant pixels determined by the unit 110, an image segmenting unit 112 carries out a segmenting of the ground plane (method step S18). The different zones of the ground plane determined by the unit 112 are output by a ground plane zone output unit 114 to a trafficability analysis unit 116 in a suitable form for further processing, said trafficability analysis unit analyzing each of the outputted different zones in terms of its trafficability (in accordance with the method steps S22 and S24 explained above), and outputs the result of the analysis, for example in the form of a list as follows:

FIG. 2:
Zone 14→trafficable
Zone 16→non-trafficable
Zone 18→non-trafficable
FIG. 3:
Zone 14→trafficable
Zone 16→non-trafficable
Zone 18→trafficable.

The above lists can be further processed as described above by a driver assistance system.

The device shown in FIG. 4 can be implemented in hardware and/or software. For example, it can be implemented in the form of an ASIC (Application Specific Integrated Circuit) or PGA/FPGA (Programmable Gate Array/Field Programmable Gate Array) or of a microprocessor or a microcontroller, which deploys firmware implementing the method shown in FIG. 1.

This invention makes possible a computationally efficient trafficability analysis, in particular for use in driver assistance systems.

LIST OF REFERENCE NUMERALS

10 Image of surroundings
12 Ground plane
14 Asphalt road with two lanes
16 Grassland/right side area of the road 14

18 Grassland/left side area of the road 14
20 Obstacle in the right side area 16
22 Obstacle in the left side area 18
24 Horizontal area
28 Driving activity in the left side area
30 Obstacle on the right side area
32 Obstacle on the right side area
100 Device for analyzing trafficability
102 First camera
104 Second camera
106 Stereovision processing unit
108 Ground plane estimation unit
110 Relevant pixel selection unit
112 Image segmenting unit
114 Ground plane zone output unit
116 Trafficability analysis unit

The invention claimed is:

1. A method for a driver assistance system of a subject vehicle, comprising the steps:
    with a sensor system of the subject vehicle, producing image data comprising plural image pixels and three-dimensional position data respectively associated with each one of the image pixels, wherein the image pixels represent at least one image of an external environment in front of the subject vehicle;
    with a processor arrangement of the subject vehicle, analyzing the image data including the three-dimensional position data to calculate respective spatial positions of the image pixels in three-dimensional space, and from the spatial positions of the image pixels determining an estimated ground plane in the at least one image;
    with the processor arrangement, classifying the image pixels into ground plane pixels and other pixels based on the three-dimensional position data, wherein the ground plane pixels belong to the estimated ground plane and the other pixels do not belong to the estimated ground plane in the at least one image;
    with the processor arrangement, analyzing only the ground plane pixels and not the other pixels to segment the estimated ground plane into ground plane zones that are distinguished from one another in the at least one image based on respective characteristic features of the ground plane pixels of the ground plane zones in the image data;
    with the processor arrangement, analyzing the image data to determine and assign, respectively to the ground plane zones, respective trafficability values that indicate whether the subject vehicle can safely drive in the respective areas of the external environment represented by the respective ground plane zones in the at least one image; and
    with the driver assistance system, outputting an information to a driver of the subject vehicle or autonomously actuating a vehicle control of the subject vehicle based and dependent on the trafficability values.

2. The method according to claim 1, wherein each one of the trafficability values is respectively an indication that the associated respective area of the external environment is either trafficable or non-trafficable.

3. The method according to claim 1, wherein the trafficability value of a first one of the ground plane zones is determined by identifying a driving activity of an other vehicle in a first one of the areas of the external environment represented by the first ground plane zone, and dependent thereon setting the trafficability value of the first ground plane zone to indicate whether the subject vehicle can safely drive in the first area represented by the first ground plane zone.

4. The method according to claim 3, wherein the trafficability value of the first ground plane zone is set to indicate that the subject vehicle can safely drive in the first area when it was identified that the other vehicle safely drove in the first area.

5. The method according to claim 3, further comprising identifying a second one of the ground plane zones of which the characteristic features are similar to the characteristic features of the first ground plane zone, and wherein the trafficability value of the second ground plane zone is determined by setting the trafficability value of the second ground plane zone to be equal to the trafficability value determined for the first ground plane zone.

6. The method according to claim 3, wherein the trafficability value of the first ground plane zone is determined dynamically and changes over time dependent on a time-varying result of the identifying of the driving activity of the other vehicle.

7. The method according to claim 1, wherein the respective trafficability value of a respective one of the ground plane zones is determined by identifying whether an obstacle protruding upwardly from the estimated ground plane exists in the respective area of the external environment represented by the respective ground plane zone, and dependent thereon setting the respective trafficability value to indicate that the subject vehicle cannot safely drive in the respective area.

8. The method according to claim 7, wherein the three-dimensional position data is determined by a stereovision analysis of a plurality of the images, and the obstacle is detected from the three-dimensional position data.

9. The method according to claim 1, wherein the three-dimensional position data is determined by a stereovision analysis of a plurality of the images, and wherein the ground plane pixels represent the estimated ground plane as a two-dimensional plane.

10. The method according to claim 1,
    wherein the three-dimensional position data is determined by a stereovision analysis of a plurality of the images, and
    wherein the characteristic features of the ground plane pixels of the ground plane zones, based on which the estimated ground plane is segmented, include a respective height variance of the ground plane pixels respectively allocated to different ones of the ground plane zones.

11. The method according to claim 1, wherein the characteristic features of the ground plane pixels of the ground plane zones, based on which the estimated ground plane is segmented, include at least one of a color, a saturation, an intensity or a texture of a portion of the at least one image represented by the ground plane pixels.

12. The method according to claim 1, further comprising, with the processor arrangement, for each respective portion of any one of the ground plane zones having any of the other pixels located above the respective portion in the three-dimensional space, assigning to the respective portion a respective one of the trafficability values comprising an indication that a respective partial area of the external environment represented by the respective portion of the ground plane zone in the at least one image is non-trafficable.

13. A device for a driver assistance system of a subject vehicle, comprising:

a sensor system that is configured and arranged to produce image data comprising plural image pixels and three-dimensional position data respectively associated with each one of the image pixels, wherein the image pixels represent at least one image of an external environment in front of the subject vehicle;

a processor arrangement that is configured and arranged to perform a method including:

analyzing the image data including the three-dimensional position data to calculate respective spatial positions of the image pixels in three-dimensional space, and from the spatial positions of the image pixels determining an estimated ground plane in the at least one image;

classifying the image pixels into ground plane pixels and other pixels based on the three-dimensional position data, wherein the ground plane pixels belong to the estimated ground plane and the other pixels do not belong to the estimated ground plane in the at least one image;

analyzing only the ground plane pixels and not the other pixels to segment the estimated ground plane into ground plane zones that are distinguished from one another in the at least one image based on respective characteristic features of the ground plane pixels of the ground plane zones in the image data; and analyzing the image data to determine and assign, respectively to the ground plane zones, respective trafficability values that indicate whether the subject vehicle can safely drive in the respective areas of the external environment represented by the respective ground plane zones in the at least one image;

and an output configured and arranged to output an information to a driver of the subject vehicle or to output a control signal configured to autonomously actuate a vehicle control of the subject vehicle, based and dependent on the trafficability values.

14. The device according to claim 13, wherein the processor arrangement comprises a microprocessor or a microcontroller, as well as software and/or firmware configured to perform the method when executed by the microprocessor or the microcontroller.

15. The device according to claim 13, wherein the processor arrangement comprises an ASIC circuit or a PGA circuit configured and arranged to perform the method.

16. A method comprising:

with a sensor system of a vehicle, producing image pixels;

with a processor arrangement of the vehicle, performing the following steps:

calculating three-dimensional position data respectively for each one of the image pixels;

evaluating the three-dimensional position data of the image pixels to determine an estimated ground plane in the three-dimensional position data of the image pixels;

analyzing only those of the image pixels of which the respective three-dimensional position data lie on the estimated ground plane and not others of the image pixels of which the respective three-dimensional position data lie above or below the estimated ground plane, and by said analyzing, segmenting the estimated ground plane into ground plane zones that are distinguished from one another based on respective characteristic features of the analyzed image pixels;

determining and assigning respective trafficability indicators respectively to the ground plane zones, wherein each one of the trafficability indicators respectively indicates that the respective assigned ground plane zone is either trafficable or non-trafficable; and outputting a signal dependent on and indicative of the trafficability indicators respectively assigned to the ground plane zones;

and with a driver assistance system of the vehicle, outputting an information to a driver of the vehicle dependent on the signal, or autonomously actuating a vehicle control of the vehicle dependent on the signal.

* * * * *